United States Patent
Su et al.

(10) Patent No.: US 7,926,983 B2
(45) Date of Patent: Apr. 19, 2011

(54) ELECTRONIC DEVICE

(75) Inventors: Cheng-Wen Su, Taipei Hsien (TW); Gang Huang, Shenzhen (CN); Zhong-Dan Deng, Shenzhen (CN); Yin-Jie Guo, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 277 days.

(21) Appl. No.: 12/339,291

(22) Filed: Dec. 19, 2008

(65) Prior Publication Data

US 2010/0039826 A1 Feb. 18, 2010

(30) Foreign Application Priority Data

Aug. 15, 2008 (CN) .......................... 2008 1 0303867

(51) Int. Cl.
*F21V 8/00* (2006.01)

(52) U.S. Cl. .......... 362/311.13; 362/311.14; 362/311.02

(58) Field of Classification Search ............... 362/311.13–311.15, 311.02, 367, 362/249.16, 249.17, 565, 644, 653, 806–808
See application file for complete search history.

(56) References Cited

U.S. PATENT DOCUMENTS

| 4,977,695 | A | * | 12/1990 | Armbruster | .................... 40/541 |
| 5,249,104 | A | * | 9/1993 | Mizobe | .......................... 362/605 |
| 6,079,136 | A | * | 6/2000 | Kozlarek | ........................ 40/541 |
| 6,729,055 | B2 | * | 5/2004 | Chou | ............................. 40/546 |
| 2003/0026100 | A1 | * | 2/2003 | Wang | ............................ 362/321 |

* cited by examiner

*Primary Examiner* — Bao Q Truong
(74) *Attorney, Agent, or Firm* — Zhigang Ma

(57) ABSTRACT

An electronic device is provided. The electronic device includes a body member defining a groove, a decorative member may be integrally insert-molded to the body member, a printed circuit board facing the body member and a lamp electrically mounted to the printed circuit board. The lamp is used to illuminate the decorative member.

5 Claims, 3 Drawing Sheets

ELECTRONIC DEVICE

BACKGROUND

1. Technical Field

The present disclosure relates to electronic devices and, particularly, to an electronic device with decorative effect.

2. Description of Related Art

Decorative colorful figures may be arranged on outside surfaces of electronic devices. Thus, the electronic device may appear more attractive.

However, the decorative effect of the electronic device often remains constant and may not be visible in the dark.

Therefore, there is room for improvement within the art.

BRIEF DESCRIPTION OF THE DRAWINGS

Many aspects of the electronic device can be better understood with reference to the following drawings. These drawings are not necessarily drawn to scale, the emphasis instead being placed upon clearly illustrating the principles of the present electronic device. Moreover, in the drawings like reference numerals designate corresponding sections throughout the several views.

DETAILED DESCRIPTION OF EXEMPLARY EMBODIMENTS

Figure 1:
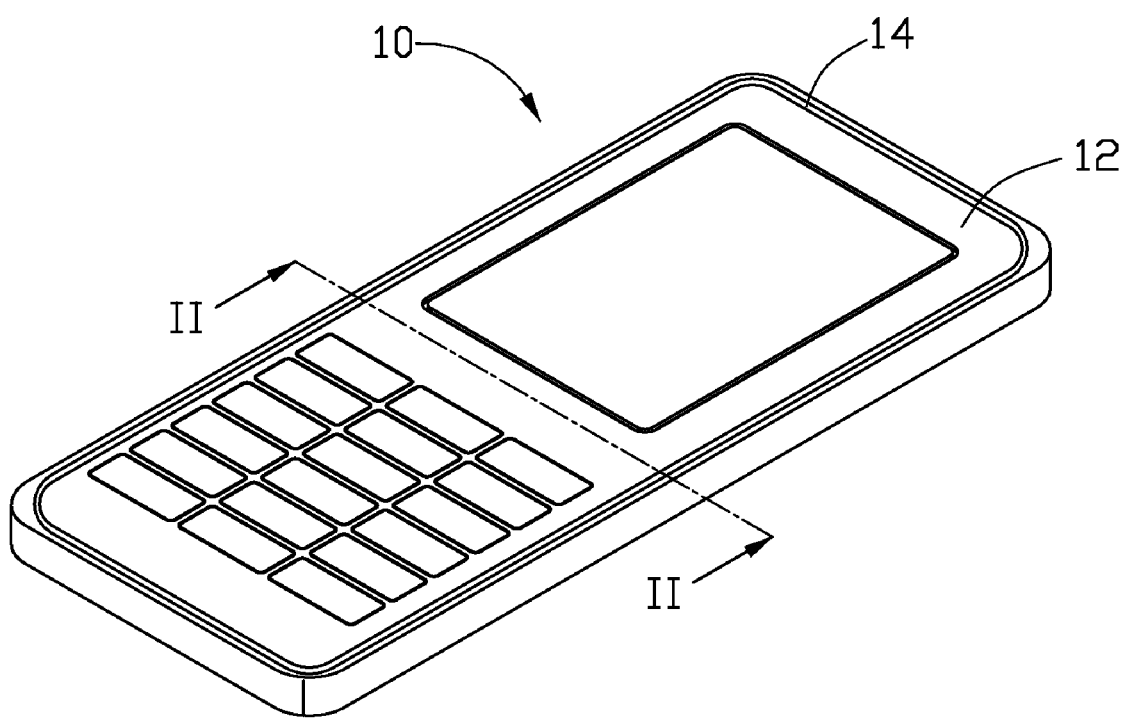
FIG. 1 is an isometric view of an electronic device, in accordance with a first exemplary embodiment.
Figure 2:
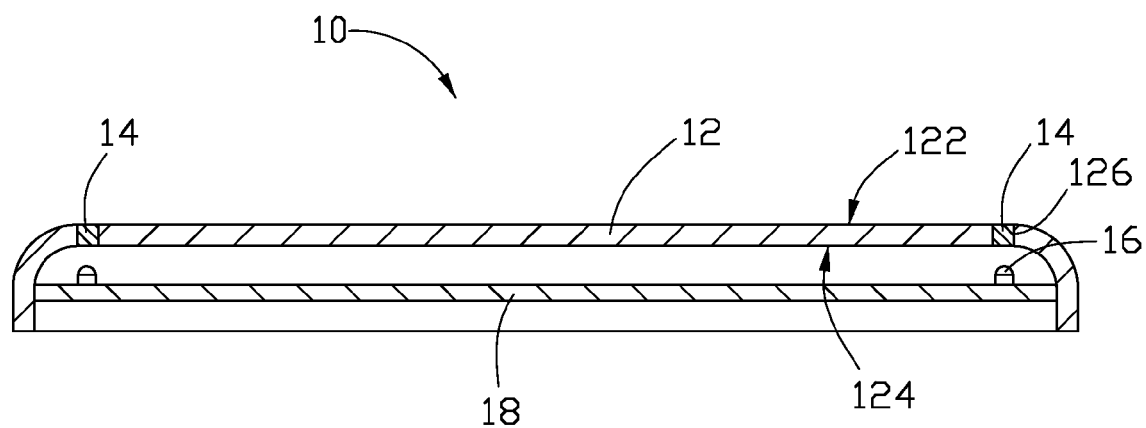
FIG. 2 is a cross-sectional view of the electronic device shown in FIG. 1 taken along line II-II.

Referring to FIGS. 1 and 2, a first exemplary electronic device 10 is shown. The electronic device 10 includes a body member 12, a decorative member 14, a lamp 16, and a printed circuit board 18.

The body member 12 may be a cover section or a body section of the electronic device and made of polycarbonate or polystyrene. The body member 12 is non-transparent. The body member 12 includes an outer surface 122 and an opposite inner surface 124. The body member 12 further defines a decorative groove 126 through the outer surface 122 and the inner surface 124. For example, the decorative groove 126 may be annular and generally follow the perimeter of the body member 12.

The decorative member 14 may be made of a transparent and light-guiding material (i.g., polypropylene). The decorative member 14 can be printed, embossed, engraved, etc., with logos or other decorations (not shown). The decorative member 14 may be integrally formed with the body member 12, such as by integrally insert-molding the decorative member 14 in the decorative groove 126.

The lamp 16 may be an LED, irradiating white, colored, or a combination of colored lights to illuminate the decorative member 14 from within the electronic device 10. The lamp 16 is electrically mounted to the printed circuit board 18 and aligned with the decorative member 14. To allow more direct light transmittal through the decorative member 14, the lamp 16 may have an outline and size corresponding to the outline of the decorative member 14.

The lamp 16 can irradiate various color lights to color the outer surface 122. Because of the backlighting effect of the lamp 16, the decorative member 14 can be visible in the dark.

Figure 3:
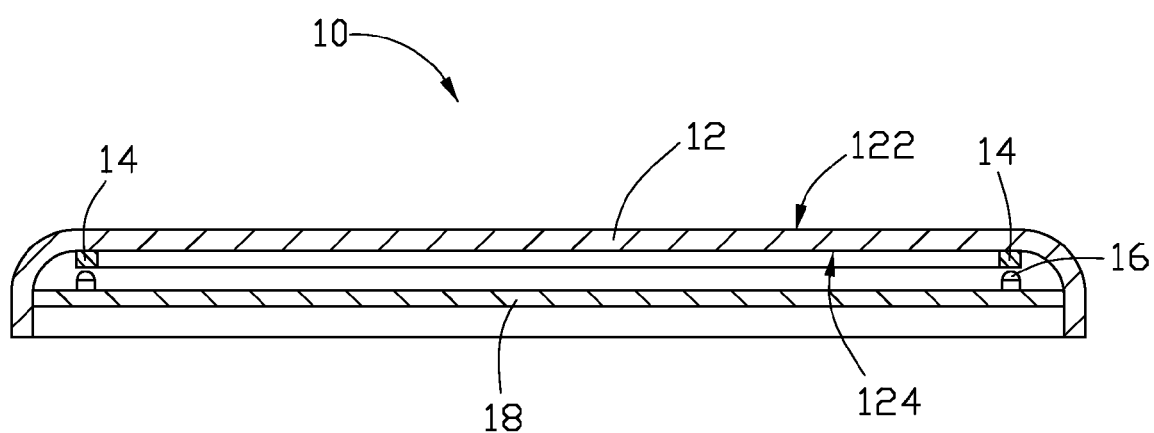
FIG. 3 is a cross-sectional view of the electronic device in accordance with a second exemplary embodiment.

Referring to FIG. 3, in an alternative exemplary embodiment, the body member 12 may lack the decorative groove 126, but be transparent. In this exemplary embodiment, light emitted from decorative member 14 is visible through the transparent body member 12. In yet another exemplary embodiment, the decorative member 14 may be insert-molded on the inner surface 124 of the body member 12.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of sections within the principles of the invention to the full extent indicated by the broad general meaning of the terms, in which the appended claims are expressed.

What is claimed is:

1. An electronic device, comprising:
   a body member;
   a decorative member integrally formed to the body member;
   a printed circuit board facing the body member; and
   a lamp electrically mounted to the printed circuit board to illuminate the decorative member;
   wherein the body member is made of non-transparent material, and the body member includes an outer surface and an opposite inner surface, a groove is defined through the outer surface and the inner surface, and the decorative member is integrally insert-molded in the groove.

2. The electronic device as claimed in claim 1, wherein the decorative member is made of a transparent, light-guiding material.

3. The electronic device as claimed in claim 1, wherein the lamp is an LED.

4. The electronic device as claimed in claim 1, wherein the body member is made of transparent material, and includes an outer surface and an opposite inner surface, the decorative member is defined on the inner surface.

5. The electronic device as claimed in claim 1, wherein the lamp has an outline and size corresponding to the outline of the decorative member.

* * * * *